Feb. 18, 1969  R. KÖHLER  3,428,082
ANNULAR NON-RETURN VALVE
Filed March 12, 1965
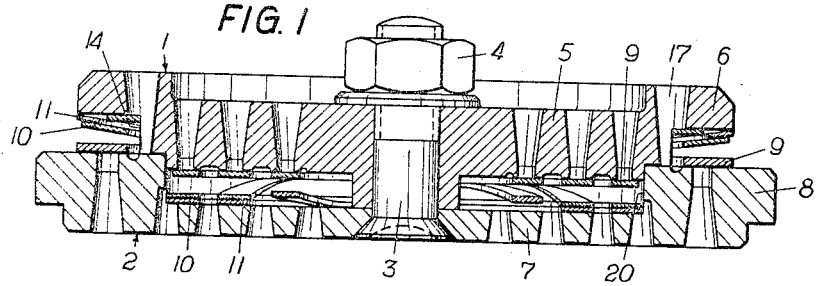
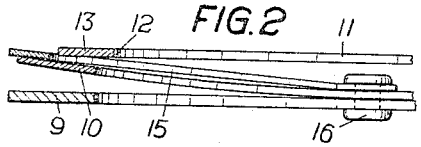
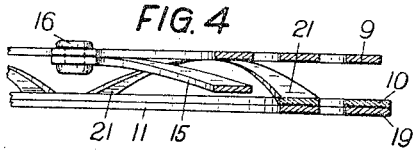
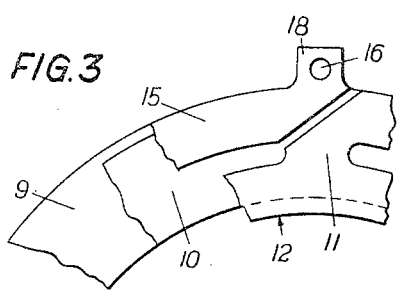
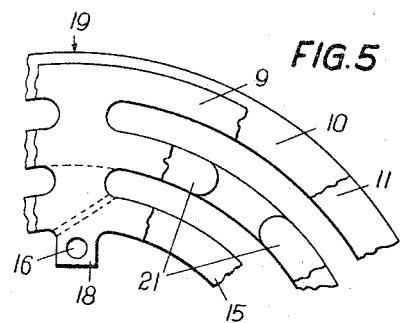
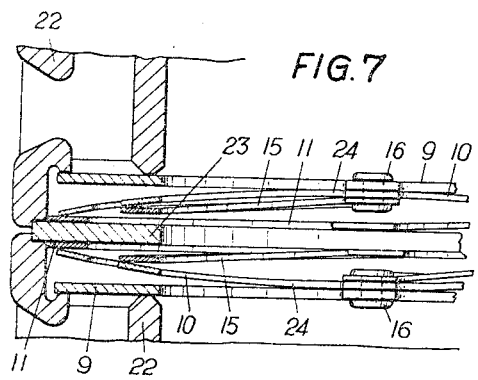
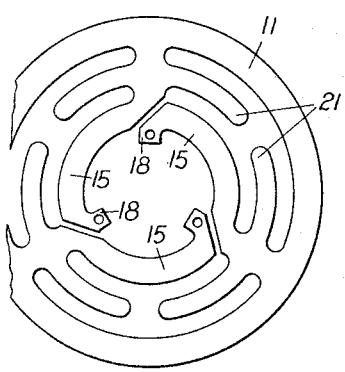
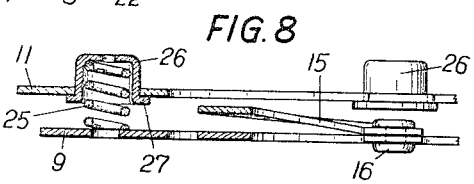
Inventor
Robert Köhler
By
Watson, Cole, Grindle & Watson
Attys.

United States Patent Office 3,428,082
Patented Feb. 18, 1969

3,428,082
ANNULAR NON-RETURN VALVE
Robert Köhler, Schongau (Lech), Upper Bavaria, Germany, assignor to Hoerriger Ventilwerke Aktiengesellschaft, Vienna, Austria
Filed Mar. 12, 1965, Ser. No. 439,262
Claims priority, application Austria, Mar. 20, 1964, 2,446
U.S. Cl. 137—516.23
Int. Cl. F01l 3/20; F16k 15/12
11 Claims

ABSTRACT OF THE DISCLOSURE

An annular non-return valve having a valve seat and a valve guard spaced from each other with passageways therein for the flow of fluid therethrough. A valve plate between the valve seat and the valve guard with a guide plate for the frictionless guidance of the valve plate and spring means between the valve plate and the guide plate to load the valve plate against the valve seat and to press the guide plate permanently against the valve guard.

---

This invention relates to an annular non-return valve, in particular for piston-type compressors, comprising at least one valve plate located between the valve seat and the valve guard and loaded by spring means, frictionless guidance being provided by means of a guide plate, the flexible guide arms of which are attached to the valve plate.

In conventional valves of this type the guide plate comprises a hub-like inner ring clamped between the valve seat and the valve guard by means of washers and connected with the guide plate via flexible arms, the said guide plate being in turn connected with the valve plate via additional flexible arms, thereby maintaining the guide plate in an intermediate position between the valve seat and the valve guard, the said guide plate exerting a pull on the valve plate by means of the flexible arms in the direction of the opening motion of the valve plate which is loaded in the direction of the closing motion by spring means overcoming the said pull. The spring means consist of helical springs located in pockets provided in the valve guard or of spring plates comprising spring tongues bent out of the plane of said spring plates, and acting upon the valve plate through appropriate recesses in the guide plate.

According to another conventional design the outermost ring of the guide plate is secured to the valve guard by means of bolts, whereas the sections of the inner rings located between the radial webs ripped open by slanting slots are combined chain-fashion to form flexible guide arms connected with the valve plate, the latter being spring loaded by means of helical springs also traversing the guide plate.

These conventional valves like those comprising a valve plate guided by means of flexible guide arms mounted thereon are unpractical insofar as additional space which is lost for flow purposes, is required for the attachment of the guide plate and/or the guide arms of the valve plate to the valve guard or between the latter and the valve seat, and so are special attaching means such as bolts, clamps etc. Particularly in view of the additional space required these conventional measures are not generally practicable, for example with the outermost valve of a concentric valve set, with valves featuring valve plates comprising one or a plurality of individual rings or with annular multiseated valves or tower valves, because the necessary space is just not available.

The drawbacks of conventional valves of this type are avoided according to the invention by the location of the spring means between the valve plate and the guide plate, said spring means pressing the guide plate permanently against the valve guard on which the said guide plate is maintained in position so as to prevent its displacement in a radial direction only. Thus the annular non-return valve according to the invention will not require the guide plate to be especially secured to the valve guard so that in spite of frictionless guidance the plates are merely inserted between the valve seat and the valve guard in the same convenient manner as with a sliding guidance during the assembly of the valve. In addition, neither the guide plate proper nor the flexible arms of same require much space in excess of the cross-section of the valve plate so that the frictionless guidance of the plates according to the invention is advantageously applicable to practically all types of annular non-return valves, and in particular to those for which the conventional designs are not suitable, such as for example to single-ring valves, multiseated and tower valves.

According to another feature of the invention, proper centering of the plates is assured by the provision of a guide plate protruding with its inner or outer rim in a radial direction over and above the rim of the valve plate, the protruding portion which is preferably formed by a solid ring closely adjoining centering means connected with the valve guard. The centering means attached to the valve guard can be defined by a continuous cylindrical surface. However, a few projections arranged over the periphery of the plate will also suffice. For example, the medium delivered may also emerge around the rim of the guide plate serving as a centering means, the radial webs located between the ports of the valve guard serving in that case as a centering means.

According to a preferred embodiment of the invention a spring plate is located between the valve plate and the guide plate, the three plates approximately overlapping each other as veiwed from above, being positively interconnected at least in two places, for example by means of rivets, so as to constitute a structural unit. Thus all plate elements of the valve can be readily inserted jointly into the valve and removed therefrom as a single unit. According to a variant of the invention, the valve plate, the spring plate and the guide plate are positively interconnected at two points located on the same plate diameter, the spring plate being approximately cylindrically vaulted, the generating line of the cylindrical surfaces thus formed being parallel to the plate diameter extending through the points of attachment. The cylindrical vaulting of the spring plate offers an additional advantage insofar as the guide arms oscillating during the impact of the valve plate upon the valve seat are prevented from dangerously continuing their oscillating motion, because they find an appropriate support on the vaulted valve plate.

According to a further variant of the invention the spring plate located between the valve plate and the guide plate is provided with flexible arms having preferably the same cross-section as the guide arms of the guide plate and secured jointly with these to the valve plate. Here too, the guide arms of the guide plate are conveniently supported by the flexible arms of the spring plate and furthermore, greater elasticity and freedom from tension is assured for the interconnection of the three plates, so that the stress to which they are subject at the connecting points, for example, at the rivets, is considerably reduced.

According to another feature of the invention the guide plate of an annular non-return valve comprising a valve plate consisting of a single ring is composed of two concentric rings interconnected by means of radial webs, one of the said rings forming the flexible guide arms and and being wholly located within the cross-section of the valve plate, whereas the other ring is of solid design and protruding with its rim over and above the rim of the valve plate so as to ensure proper centering. This design is particularly suitable for single-ring and individual ring valves, because no additional space is required for the guide plate over and above the cross-section of the valve plate. This convenient and simple design is advantageously applicable to valves comprising two concentric annular ports, each controlled by means of a valve plate consisting of a single ring, the guide plate of the outer ring being centered at its outer rim, whereas the guide plate of the inner ring resting with its inner rim against a centering means, so as to provide a continuous free annular gap for the passage of the flow medium between the two rings.

Still another embodiment of the invention provides for spring means formed by spring tongues bent out of the guide plate towards the valve plate. This is a particularly simple design where a special spring plate can be dispensed with. Finally, according to the invention, the spring means can be formed by helical springs located between the valve plate and the guide plate, said helical springs extending preferably through the guide plate and engaging in cup-shaped guide means connected with the guide plate.

These and further optional embodiments of the invention are hereafter described in detail with reference to the accompanying drawing in which:

FIG. 1 is an axial cross-section of a valve assembly comprising concentrically arranged suction and delivery valves, FIG. 2 shows a cross-section on an enlarged scale of the plate elements of the outer valve, FIG. 3 is a plan view of the elements shown in FIG. 2, FIGS. 4 and 5 are a cross-section and plan view respectively, of the plate elements of the inner valve, FIG. 6 illustrates a plan view of a modified design of the guide plate, FIG. 7 is a cross-section of another embodiment of the invention, and FIG. 8 shows an axial cross-section of the plate elements of another variant of the invention.

The concentrical valve assembly as shown in FIG. 1 comprises two disk-shaped bodies 1 and 2 interconnected by means of a bolt 3 and nut 4 and each constituting the valve seat of the one valve and the valve guard of the other valve, respectively. The disk-shaped body 1 with its inner, higher portion serves as a valve seat 5 for the inner suction valve and with its thinner rim portion as a valve guard 6 for the outer delivery valve, whereas the inner portion of the disk-shaped body 2 constitutes the valve guard 7 of the suction valve and the outer portion of same the valve seat 8 of the delivery valve. In both valves a valve plate 9, a spring plate 10 and a guide plate 11 are provided between the valve seat 5, 8 and the valve guard 7, 6, the spring plate 10 being located between the valve plate 9 and the guide plate 11 so that the valve plate 9 is pressed against the valve seat and the guide plate 11 against the valve guard of their associated valves by the action of the spring means. The guide plate 11 is not secured to the associated valve guard nor clamped between the two disk-shaped bodies 1, 2 but maintained at the valve guard in a position precluding radial displacement.

As will be seen in particular in FIGS. 2 and 3, the guide plate 11 of the outer delivery valve protrudes with its inner rim 12 over and above the rim of the valve plate 9 comprising a single ring, and abuts with the protruding portion which in this instance is formed by the solid inner ring 13 of the guide plate 11, tightly against a shoulder 14 of the disk-shaped body 1 extending from the valve guard 6 (see FIG. 1). On the other hand, the outer ring of the guide plate 11 comprises flexible guide arms 15 secured to the valve plate 9 by means of rivets 16. According to this embodiment of the invention the spring plate 10 is cylindrically vaulted and connected jointly with the guide arms 15 with the valve plate 9 by means of the rivets 16. The three plates 9, 10 and 11 with approximately overlapping cross-sections thus constitute a combined structural element to be inserted loosely between the valve seat 8 and the valve guard 6 without any additional attachment, the inner ring 13 of the guide plate 11 resting permanently tightly against the valve guard 6 and being maintained in a position precluding axial displacement by the shoulder 14 serving as a centering means and consisting in this instance of a cylindrical surface interrupted by the ports 17 only, so as to provide frictionless guidance for the valve during the stroke motion. For the interconnection of the three plates 9, 10 and 11 radial extensions 18 are provided on their rims with rivets 16 extending through the said extensions.

The valve plate 9 of the inner suction valve comprises three concentrical rings interconnected in a manner known per se by means of radial connecting webs so as to form a solid slotted plate. The associated guide plate 11 is of approximately the same cross-section but for its outer rim 19 which protrudes slightly beyond the valve plate 9 and abuts tightly against a shoulder 20 of the disk-shaped body 2 constituting the centering means. As appears from FIGS. 4 and 5 the inner ring of the guide plate 11 provides the flexible guide arms 15 secured to the valve plate 9 by means of rivets 16 traversing the radial extensions 18 of the valve plate 9 and of the guide arms 15 provided on the inner rim. The spring plate 10 located between the valve plate 9 and the guide plate 11 comprise in this example of an embodiment of the invention two concentrical rings, the outer one of which is solid and abuts with its outer rim also tightly against the shoulder 9 so as to ensure proper centering, whereas the inner ring defines spring tongues 21 bent out of the plane of the plate toward the valve plate 9. Again, the guide plate 11, loaded by the spring tongues 21 of the spring plate 10 abuts permanently tightly against the valve guard 7, so as to provide frictionless guidance for the valve plate 9 by means of the guide arms 15.

According to the arrangement as illustrated in FIGS. 4 and 5 the spring plate 10 may also comprise three concentric rings, the innermost of which defines flexible arms corresponding to the guide arms of the guide plate, the said flexible arms being secured to the valve plate 9 together with the guide arms 15, so as to interconnect all of the three plates again to produce a combined structural unit. In this case there is no need for centering the spring plate at its outer rim.

According to another variant of the invention the valve plate can also be dispensed with altogether, if as shown in FIG. 6, the guide plate 11 is provided with spring tongues 21 bent out of its plane. The guide plate 11 illustrated in plan form in FIG. 6 comprises three concentric rings, of which the outer ring is solid and serves for centering purposes, whereas the middle ring defines the spring tongues 21 and the innermost ring is divided into three flexible guide arms 15 having radial extensions 18 to provide a connection with the valve plate.

The annular valve shown in FIG. 7 is composed of a plurality of overlying individual valves arranged in tiers and comprises seat bodies 22 between each of which a valve guard 23 consisting of a plate is inserted by clamping. Each valve guard 23 is associated with two individual annular valves the plate elements of which impinge upon the valve guard 23 in opposite direction during the opening of the valve. The arrangement of the plate elements is similar to that in the embodiment of the invention illustrated in FIG. 2. A cylindrically vaulted spring plate 10 is provided between the valve plate 9 composed of a single ring and the guide plate 11, and all three plates are inter-connected in two places located on the same plate diameter by means of rivets 16, the guide plate 11 abutting with its outer rim against the seat bodies 22, whereas the guide arms 15 are defined by the inner ring. As different from the embodiment of the invention illustrated in FIG. 2 the cylindrically vaulted spring plate 10 is in addition, also subdivided into two concentric rings of which the inner ring is slotted and defines flexible arms 24 having the same cross-section as the guide arms 15 of the guide plate 11 and secured to the valve plate 9 together with the said guide arms. This arrangement provides for greater flexibility of the interconnection of the three plates and diminishes the stresses to which the points of attachment and/or the rivets are subject during the operation of the valve.

Finally, FIG. 8 illustrates an arrangement where the spring elements are formed by helical springs 25 located between the valve plate 9 and the guide plate 11. In order to provide positive support for the helical springs 25, the same are inserted with one extremity in a cup-shaped guide means 26 extending through the guide plate 11 and connected therewith by means of its flanged rim 27, appropriate recesses being provided in the guide plate 11 for the guide means 26. The helical springs 25 press the guide plate 11 tightly against the valve guard on which they are maintained in a position precluding radial displacement. Since here too, the guide plate 11 is positively connected with the valve plate 9 by means of flexible guide arms 15 and rivets 16, frictionless guidance is provided for the valve plate during the stroke motions of the valve. The flanged rim 27 of the guide means 26 can also be countersunk in the guide plate, so as to allow the valve plate 9 to abut tightly against the guide plate 11 during the opening of the valve. Furthermore, an appropriately locked connection between the guide means 26 and the guide plate 11 can also be provided by other means, such as by welding.

Further embodiments of the basic idea are possible without exceeding the scope of the invention. In particular, the spring plates being cylindrically vaulted or comprising spring tongues bent out of the plane of the plate as shown in the embodiments of the invention hereabove described can be replaced by other conventional devices, such as corrugated spring rings and combinations of same with other spring elements. According to the essential feature of the invention the spring elements and/or the spring actions should load the valve plate and the guide plate in opposite directions so that the guide plate is permanently applied against the valve guard and requires centering in a radial direction only.

I claim:

1. A valve, particularly for piston-type compressors, comprising a valve seat and a valve guard arranged in spaced relation to the valve seat, the valve seat and the valve guard having passageways therein for the flow of fluid therethrough, a valve plate disposed between the valve seat and the valve guard, a guide plate for the frictionless guidance of the valve plate, said guide plate having flexible guide arms, the free extremities of which are attached to the valve plate, spring means located between the valve plate and the guide plate to load the valve plate against the valve seat and to press the guide plate against the valve guard, and further means to maintain the guide plate in position on the valve guard to substantially prevent its displacement in a radial direction, the displacement of the guide plate in an axial direction being prevented only by the spring means.

2. A valve as claimed in claim 1 wherein the guide plate protrudes with its inner rim in a radial direction over and above the rim of the valve plate and abutting with the protruding portion against said further means.

3. A valve as claimed in claim 1 wherein the guide plate protrudes with its outer rim in a radial direction over and above the rim of the valve plate and abutting with the protruding portion against said further means.

4. A valve as claimed in claim 1, wherein the said spring means comprise at least one spring plate located between the valve plate and the guide plate, these three plates being solidly combined in at least two places so as to form a structural unit.

5. A valve as claimed in claim 4, wherein the said three plates approximately overlap each other as viewed from above and are solidly interconnected by means of rivets in at least two places so as to constitute a structural unit.

6. A valve as claimed in claim 4, wherein the valve plate, the spring plate and the guide plate are solidly interconnected in two places located on the same plate diameter, the said spring plate being approximately cylindrically vaulted, the generating line of the cylindrical surface thus produced extending parallel to the plate diameter extending through the points of interconnection.

7. A valve as claimed in claim 4, wherein the said spring plate arranged between the valve plate and the guide plate, is provided with flexible arms presenting essentially the same cross-section as the guide arms of the guide plate and secured to the valve plate together with the said guide arms.

8. A valve according to claim 1, in which the valve plate consists of a single ring, the guide plate comprising two concentric rings interconnected by means of radial webs, one of the guide plate rings forming the flexible guide arms of the guide plate and being entirely located within the cross-section of the valve plate, and the other guide plate ring being of solid design and having its rim protruding in a radial direction beyond the rim of the valve plate, the solid guide plate ring abutting with its protruding rim against said further means to ensure proper centering of the valve plate.

9. A valve according to claim 1, in which the said spring means are formed by spring tongues bent out of the guide plate toward the valve plate loading the same against the valve seat and pressing the guide plate against the valve guide.

10. A valve according to claim 1, in which the said spring means are formed by helical springs acting between the valve plate and the guide plate.

11. A valve according to claim 1, in which the said spring means are formed by helical springs acting between the valve plate and the guide plate, the helical springs extending through the guide plate, cup-shaped guide means connected to the guide plate, and the helical springs being positioned with one of their extremities upon the valve plate and engaging with their other extremity in said cup-shaped guide means.

References Cited

UNITED STATES PATENTS

| 1,695,069 | 12/1928 | Tuttle | 137—516.13 |
| 2,609,296 | 7/1952 | Kehler | 137—516.13 |
| 2,833,305 | 5/1958 | Muckley et al. | 137—516.13 |

FOREIGN PATENTS 646,092   7/1928   France.

OTHER REFERENCES

German Printed Application #24192, Kehler, May 1956.

ALAN COHAN, Primary Examiner.

DAVID J. ZOBKIW, Assistant Examiner.